(12) United States Patent
Higganbotham et al.

(10) Patent No.: US 7,014,403 B1
(45) Date of Patent: Mar. 21, 2006

(54) FINISH SCREW FASTENER

(75) Inventors: Dale Higganbotham, Broken Arrow, OK (US); Steven M. Tipton, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 0 days.

(21) Appl. No.: 10/650,838

(22) Filed: Aug. 28, 2003

(51) Int. Cl.
*F16B 31/00* (2006.01)

(52) U.S. Cl. .................. 411/5; 411/399; 411/911

(58) Field of Classification Search .............. 411/2, 411/3, 5, 7, 387.2, 399, 911
See application file for complete search history.

(56) References Cited

U.S. PATENT DOCUMENTS

| | | | | |
|---|---|---|---|---|
| 1,249,592 A | * | 12/1917 | Bruhn | 411/394 |
| 1,698,951 A | | 1/1929 | Holmes | |
| 2,685,812 A | * | 8/1954 | Wmitroff | 411/7 |
| 3,096,680 A | | 7/1963 | Dudgeon | 85/28 |
| 3,343,443 A | * | 9/1967 | Moore | 411/5 |
| 3,464,473 A | * | 9/1969 | Winslow | 411/259 |
| 4,125,051 A | * | 11/1978 | Herkes et al. | 411/402 |
| 4,273,175 A | | 6/1981 | Capuano | 411/168 |
| 4,512,697 A | * | 4/1985 | Cascini | 411/7 |
| 4,655,656 A | * | 4/1987 | Jonsson | 411/337 |
| 4,662,806 A | | 5/1987 | Reed | 411/2 |
| 4,904,122 A | * | 2/1990 | Herbst et al. | 405/259.1 |
| 5,020,949 A | * | 6/1991 | Davidson et al. | 411/7 |
| 5,120,168 A | | 6/1992 | Padula | 411/5 |
| 5,228,250 A | | 7/1993 | Kesselman | 52/98 |
| 5,531,554 A | | 7/1996 | Jeanson et al. | 411/399 |
| 5,584,625 A | | 12/1996 | Petri | 411/5 |
| 5,647,712 A | | 7/1997 | Demirdogen et al. | 411/404 |
| 5,683,217 A | | 11/1997 | Walther et al. | 411/399 |
| 5,713,705 A | | 2/1998 | Grunbichler | 411/5 |
| 5,746,556 A | * | 5/1998 | Sato | 411/5 |
| 5,868,536 A | | 2/1999 | Nojikawa | 411/310 |
| 6,062,788 A | | 5/2000 | Ying-Feng | 411/480 |
| 6,070,774 A | * | 6/2000 | Rak et al. | 411/7 X |
| 6,082,941 A | * | 7/2000 | Dupont et al. | 411/7 |
| 6,146,070 A | | 11/2000 | Koma | 411/5 |
| 6,361,258 B1 | | 3/2002 | Heesch | 411/178 |
| 6,364,688 B1 | * | 4/2002 | Fraley, II et al. | 411/7 |

FOREIGN PATENT DOCUMENTS

DE 1023639 * 1/1958 .......... 411/3

* cited by examiner

*Primary Examiner*—Flemming Saether
(74) *Attorney, Agent, or Firm*—Head, Johnson & Kachigian

(57) ABSTRACT

A fastener including a head having a screw driver or wrench engagement feature. The fastener includes a threaded shank extending from the head. A plurality of voids or scores in the shank spaced from but near the head permit rotational torque on the head in one direction significantly greater than rotational torque in an opposite direction so that rotational torque in an opposite direction causes the head to break off from the shank.

2 Claims, 4 Drawing Sheets

FINISH SCREW FASTENER

BACKGROUND OF THE INVENTION

1. Field of the Invention

The present invention relates to a fastener for attaching materials that normally would be fastened with a screw or with a finish nail. In particular, the present invention is directed to a fastener having a self-removing head which will shear off from the shaft of the fastener when rotated in a direction counter to the fastening direction leaving a counter sunk fastener.

2. Prior Art

Finish nails are often utilized in applications where screw heads are not desirable to be seen, such as on fine pieces of furniture. Finish nails are also utilized in applications where it is not desired to utilize a regular nail having a normal head or a normal screw having a normal head which requires counter sinking the hole and covering the nail head or screw head.

Attempts to address these issues in the past include Dungeon (U.S. Pat. No. 3,096,680) which discloses a double-headed nail with wings that project outwardly from the shaft. A flat web 24 may be gripped by a claw hammer and twisted to remove the head, thus providing a break-off head for a nail.

Holmes (U.S. Pat. No. 1,698,951) discloses a threaded screw with spiral grooves 4 extending from the end of the shank to the base.

Capuano (U.S. Pat. No. 4,273,175) discloses a threaded bolt with retainer elements 28 similar to barbs in order to prevent reverse rotation.

Reed (U.S. Pat. No. 4,662,806) discloses a lacing plug 60 with a break-off groove 70.

Padula (U.S. Pat. No. 5,120,168) discloses a threaded screw 4 with a narrow neck 2 connected to a head 1 to permit break off of the head, at a torque equal in the clockwise and counter clockwise direction.

Kesselman (U.S. Pat. No. 5,228,250) discloses a threaded bolt with reduced thickness of metal to shear apart or rupture upon application of torque.

Jeanson et al. (U.S. Pat. No. 5,531,554) discloses a screw fastener with collar 30 having radial notches 31.

Petri (U.S. Pat. No. 5,584,625) discloses a bolt with a shearable head 1 having a taper section 7 forming a predetermined breaking point 6.

Grunbichler (U.S. Pat. No. 5,713,705) discloses a threaded bolt having a torque head 3 which breaks off from a permanent clamping head 2.

Nojikawa (U.S. Pat. No. 5,868,536) discloses threads 4 provided with protrusions at every pitch which protrude from threads 4 in order to prevent loosening of the screw.

Ying-Feng (U.S. Pat. No. 6,062,788) discloses a nail with a nail head 10 which may be rotated to one side so that the nail head is separate from the nail body 11 by virtue of indentations 15.

Koma (U.S. Pat. No. 6,146,070), in FIGS. 14 and 15, discloses a break-off head for a bolt.

Nevertheless, there remains a need to provide a finish screw fastener which will provide the superior holding power of a threaded screw while producing a small diameter hole like that of a finish nail.

There remains a need to provide a finish screw fastener having a self-removing head.

Accordingly, it is a principal object and purpose of the present invention to provide a finish screw fastener that has superior holding power compared to the holding power of a finish nail, spike, staple or pin.

It is a further object and purpose of the present invention to provide a finish screw fastener that permits insertion into materials with common tools, such as a Phillips, flat blade, or hex head screwdriver.

It is a principal object and purpose of the present invention to provide a finish screw fastener having a self-tapping design that does not require creation of a pilot hole to permit initial insertion to avoid splitting of common materials such as wood or plastics.

It is a further object and purpose of the present invention to provide a self-removing head that shears off of the fastener shaft when it is turned in a counter clockwise direction at a point after insertion into the fastened material by turning in a clockwise direction.

It is a further object and purpose of the present invention to provide a finish screw fastener that allows counter sinking into materials after the screw head is removed without having to manually counter sink the screw.

It is a further object and purpose of the present invention to provide a finish screw fastener having a design that will not scratch the surface of the fastened material while the fastener is reaching its final depth prior to removal of the fastener head.

It is a further object and purpose of the present invention to provide a finish screw fastener that can withstand large clockwise torque force in relation to counter clockwise torque force so that the fastener can be used in a wide range of both hard and soft materials.

SUMMARY OF THE INVENTION

The present invention is directed to a finish screw fastener which includes a full-size head attached to a relatively small finish head and threaded shank. The full-size head permits insertion of the fastener with standard tools. The full-size head includes an engagement mechanism in order to receive a screwdriver, wrench or other rotational driver implement. Extending from the full-size head is a threaded shank. In the present embodiment, a finish head is juxtaposed between the full-size head and the shank.

In order to install, the fastener is rotated in a first direction, in the present case, in a clockwise direction to rotate the fastener and move it axially.

A plurality of voids or scores in the shank are spaced from but near the head in order to permit rotational torque on the head in one direction significantly greater than rotational torque in an opposite direction. In this manner, rotational torque in the opposite direction causes the head to break off from the shank. During installation, the fastener is rotated until the fastener moves in an axial direction and the voids or scores in the shank are beneath the level of the surface of the material. Thereafter, the screwdriver or rotational engagement mechanism is rotated in the opposite direction. Since the clockwise torsional strength is significantly greater than the counter clockwise torsional strength, rotation of the screwdriver in the head in the counter clockwise direction will cause the head to break apart and separate from the shank.

DETAILED DESCRIPTION OF THE PREFERRED EMBODIMENTS

Figure 1:
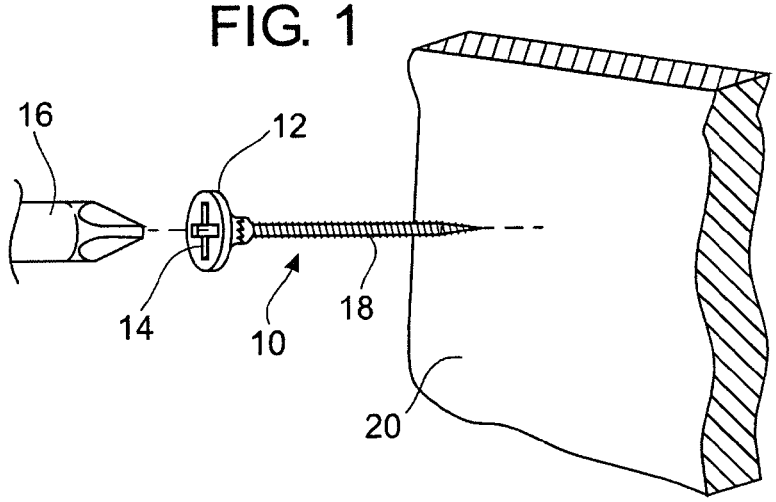
FIGS. 1 through 4 illustrate a sequential installation and application of a finish screw fastener as constructed in accordance with the present invention.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, the present invention provides a fastener having a series of intentionally imposed voids of specific geometry around the circumference of the fastener at the base of the screw head.

In a first preferred embodiment shown in FIGS. 1 through 8, a finish screw fastener 10 includes a full-size head 12 attached to a relatively small finish head and threaded shank. The full-size head 12 permits insertion of the fastener with standard tools such as Phillips, flat blade, or hex head screw driver or screw gun. Without the full size head 12, special tools would be required for application and/or the invention would have to include expensive, high strength materials to withstand the stresses that would be exerted during installation and application.

FIGS. 1 through 4 illustrate the sequential installation and implementation of the finish screw fastener 10 of the present invention.

The full-size head 12 includes an engagement mechanism 14 in order to engage a screwdriver 16, wrench (not shown) or other rotational driver mechanism. In FIGS. 1 through 8, a Phillips head engagement mechanism is illustrated, however, it will be understood that flat blade or hex head screwdrivers or other types of engagement mechanisms may be utilized within the teachings of the present invention.

Extending from the full-size head 12 is a threaded shank 18. In the present embodiment, a finish head 26 is juxtaposed between the full-size head 12 and the shank 18.

The fastener 10 is aligned over and above a material or materials to be secured to, in the present case, a piece of wood 20.

Figure 2:
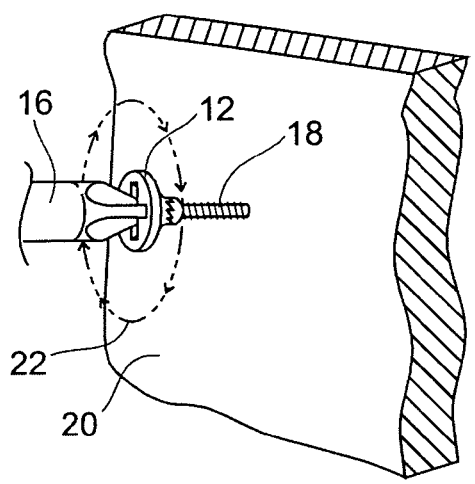
Figure 3:
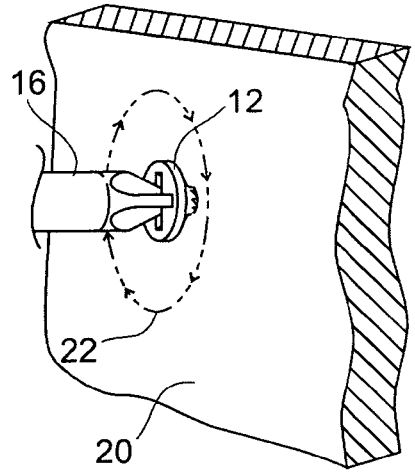

As seen in FIGS. 2 and 3, the fastener 10 is rotated in a first direction. In the present case, the fastener is rotated in the clockwise direction as illustrated by arrows 22 to move the fastener axially.

In the embodiment shown, a plurality of voids, scores, or indentations in the shank 18 are spaced from but near the head 12 in order to permit rotational torque on the head in one direction significantly greater than rotational torque in an opposite direction. As will be seen, in this manner, rotational torque in the opposite direction causes the head 12 to break off from the shank 18. As seen in FIG. 3, the fastener 10 is rotated until the fastener moves in an axial direction and the plurality or series of voids or scores in the shank are beneath the level of the surface of the wood 20 or other material.

Figure 4:
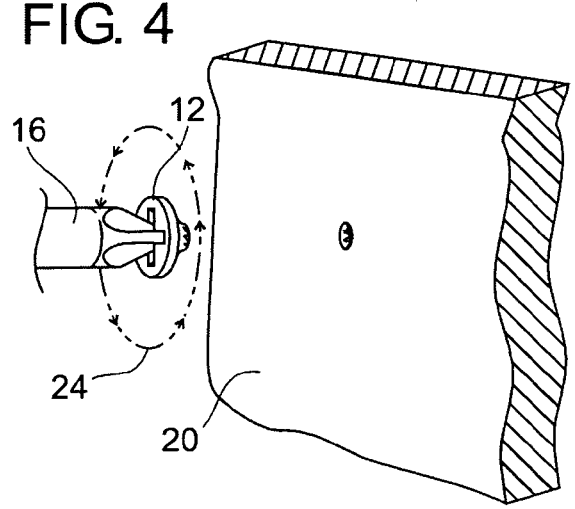

Thereafter, as best seen in FIG. 4, the screwdriver 16 is rotated in the opposite direction, in this case the counter clockwise direction, as illustrated by arrows 24.

Since the clockwise torsional strength is 2 to 3 times the counter clockwise torsional strength, rotation of the screwdriver in the head 12 in the counter clockwise direction will cause the head to break apart and separate from the shank.

The critical diameters of the invention may be observed from FIGS. 5 through 8. The diameter of threaded shank and the major diameter of the screw threads are minimized in order to reduce the wedging forces that could tend to induce splitting of the wood during insertion. The pitch of the thread (distance between adjacent threads) is made as large as possible to reduce the number of rotations required for full insertion, but small enough to facilitate a low insertion torque requirement. The thread profile is intentionally sharp on the edges to cut into the wood, as opposed to wedging the wood grain apart. As an option, wax or some other permanent coating could be used to reduce the insertion torque, thus allowing the smallest possible shank diameter.

The inclusion of threads on the shank 12 of the fastener 10 provides substantial improvement in holding capacity relative to smooth finish nails, spikes, pins or staples. The axial force required to remove the threaded fastener depends on the type of wood into which it is driven, but this is estimated to be several times that required to remove a smooth finish nail.

Figure 5:
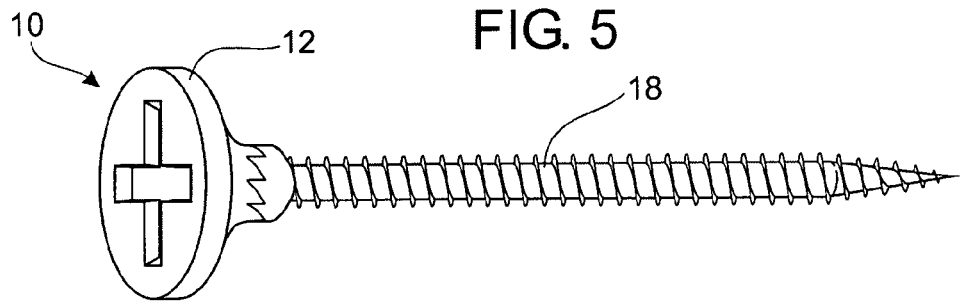
FIG. 5 illustrates a perspective view of a finish head fastener constructed in accordance with the present invention.
Figure 6:
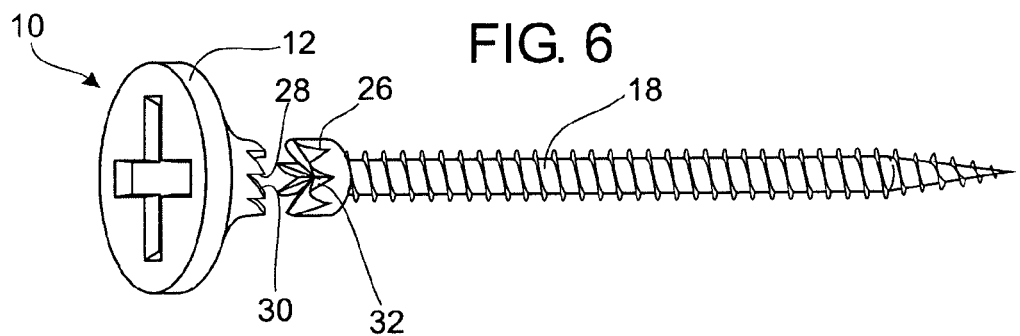
FIG. 6 illustrates the finish head fastener of FIG. 5 with the head separated from the shank.
Figure 7:
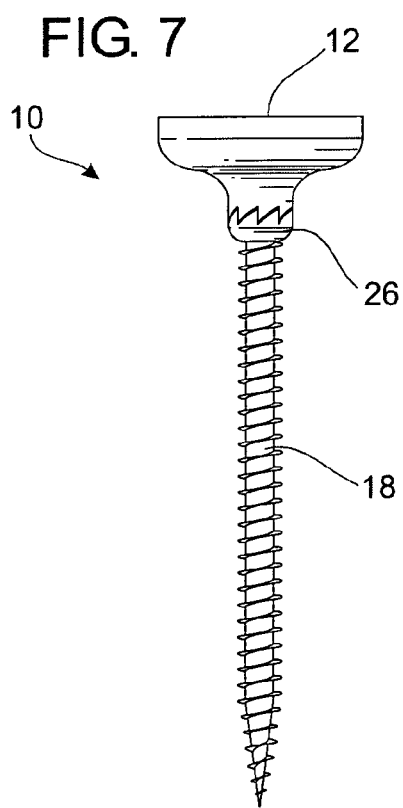
FIG. 7 illustrates a side view of the finish screw fastener shown in FIG. 5.
Figure 8:
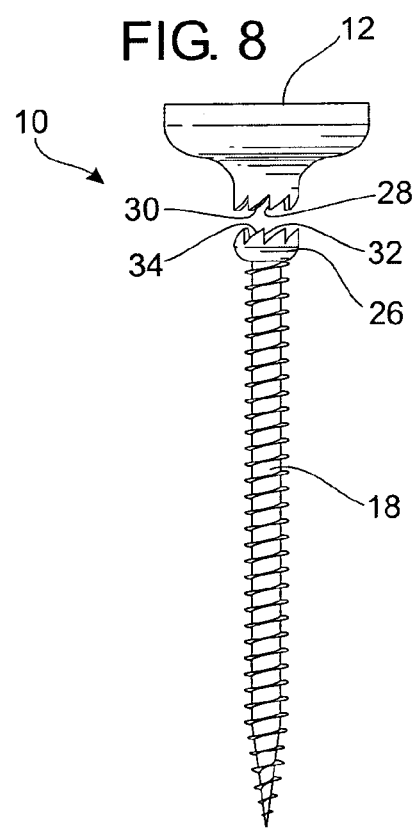
FIG. 8 illustrates a side view of the finish screw fastener shown in FIG. 7 with the head separated from the shank.

FIGS. 5 and 7 illustrate the fastener 10 prior to installation. FIGS. 6 and 8 illustrate the fastener with the head 12 apart from the shank 18. A lower end of the head 12 includes a saw-tooth surface with a plurality of first edges 28 which are parallel to a center axis of the head and shank. The head 12 also includes a plurality of second edges 30 which are in angular relationship to the first edges. In particular, in the present embodiment, the second edges are at approximately a 45° angle to the first edges 28. The upper end of the shank 18, in the case the finish head 26, has corresponding first edges 32 which are parallel to the center axis of the shank and second edges 34 in angular relationship to the first edges.

In this manner, the fastener can withstand 2 to 3 times the amount of torque when driven in the clockwise direction verses the counterclockwise direction. In the embodiment shown in FIGS. 1 through 8, this is facilitated through the design of ratchet type "teeth" formed into the base of the fastener, between the full-size head and the smaller finish head, as shown in FIG. 1. The teeth on the full-size head 12 engage the teeth on the finish head when driven in the clockwise direction. While the teeth are engaged, they have a torsional strength that is nearly equal to a shaft with a diameter equal to the outer diameter of the finish head itself. However, when driven in the counterclockwise direction, the teeth cam apart from each other and no longer support the torsional load. This transfers the torque to the base of the ratchet teeth, where the diameter is much smaller, with a correspondingly diminished torque carrying capacity. Additionally, the axial force caused by the cam-action of the angled faces of the ratchet teeth works to force the full-size head away from the finish head.

Reducing the overall diameter (shank and major screw diameters) reduces the torque carrying capacity of the screw, but also reduces the torque required to drive the screw, and the splitting forces associated with the screw. The torque, T, sustainable by a shaft of circular cross section with a diameter of d, is given by the relation $$T = \frac{\tau_u \pi d^3}{16}$$

where $\tau_u$ is the ultimate shear strength of the shaft material. For this design, the finish screw head diameter is about 1.4 to 1.5 times the diameter of the threaded shank, making the head 2.7 to 3.4 times stronger in torsion than the shank. When the torque is clockwise the strength of the screw is based on the shank diameter. When the torque is counterclockwise, the root of the ratchet teeth, with a diameter about 10% less than the shank diameter, must carry the reverse torque. This makes the counterclockwise torsional strength about 30% less than the clockwise torsional strength, based on torsion only. However, two additional factors work to further reduce the reverse torsional strength: (a) the cam action of the ratchet teeth wedging apart axially and (b) the stress concentration at the root of the teeth, due to the sharp notch caused by forming the ratchet teeth geometry. Considering these factors, the ratio of clockwise to counterclockwise torsional strength approximately doubles from 1.3 to a value between 2 and 3.

For example, the clockwise torsional strength for a shank diameter of 0.135" is about 22 in-lb, based on a material torsional strength of 46,200 psi. The counterclockwise strength for the root diameter of 1.215" is reduced to 16.3 in-lb based on diameter only, or to about 8 in-lb factoring in axial loading and stress concentration.

This combination of a fastener with a high clockwise torque capacity and a low counterclockwise torque required to break off the head, facilitates the use of the invention with a wide range of materials with varying densities and hardness. The density and hardness of the material affect the torques required to drive the screw in both directions.

Figure 12:
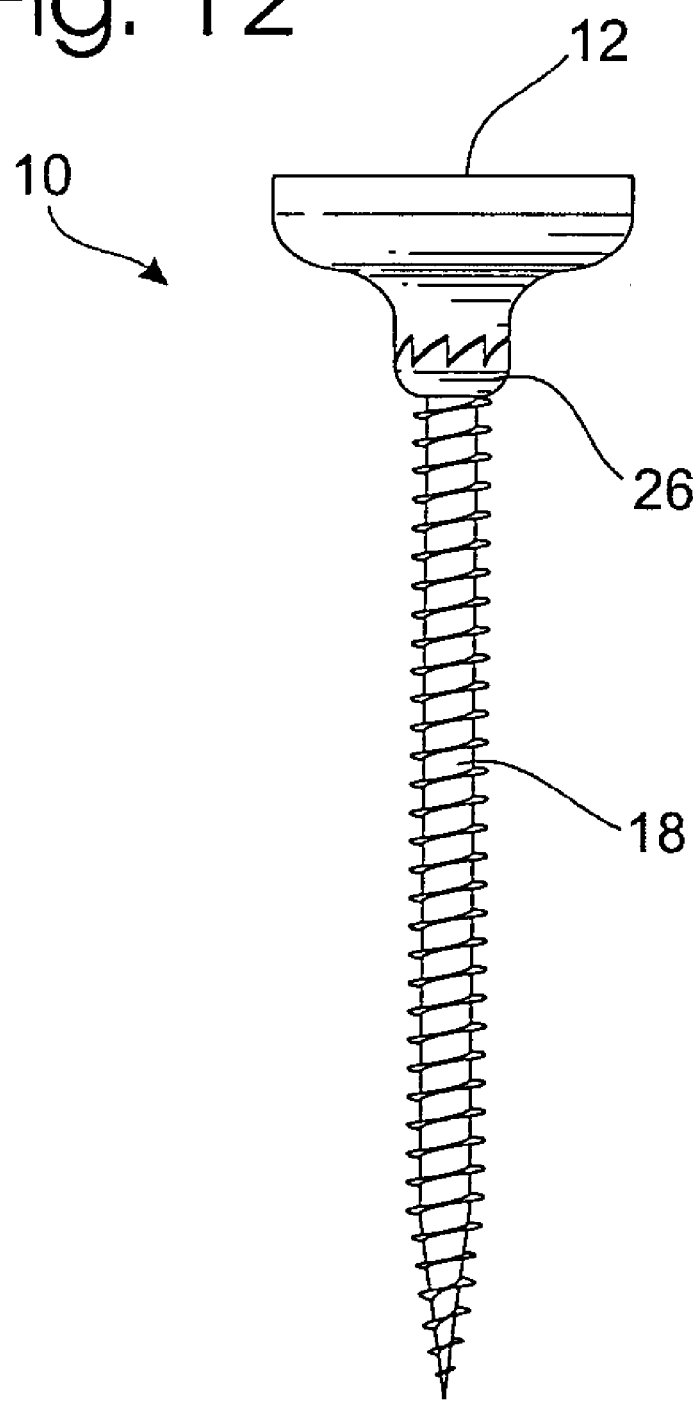

The fastener 10 may be fabricated in a number of ways. It may be fabricated from two independent pieces press fit or otherwise brought together. Alternately, the fastener 10 may be fabricated from a single piece with scores, voids, or indentations rolled, stamped or formed therein, as shown in FIG. 12.

Figure 9:
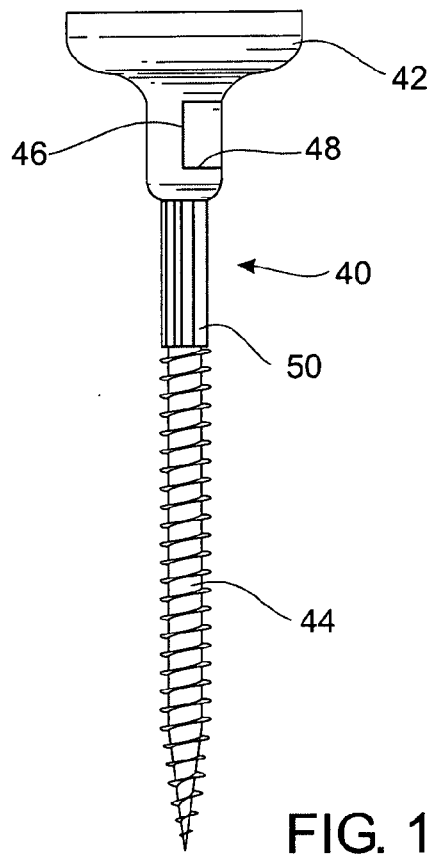
FIGS. 9 and 10 show alternate side views of a second, alternate embodiment of a finish screw fastener constructed in accordance with the present invention.
Figure 10:
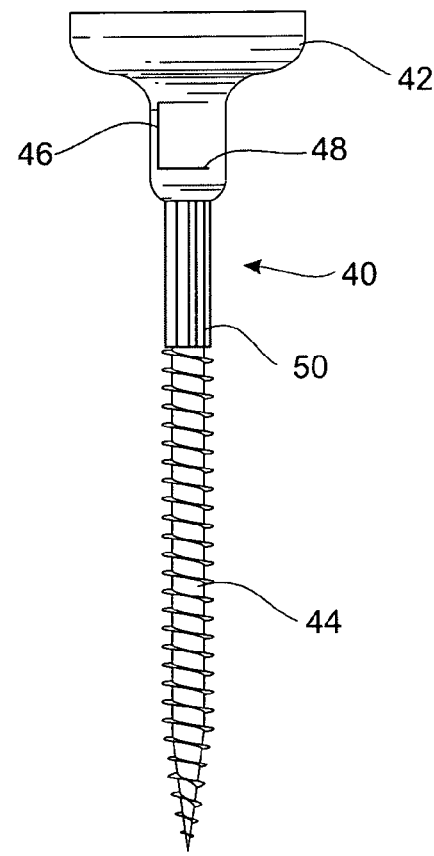
Figure 11:
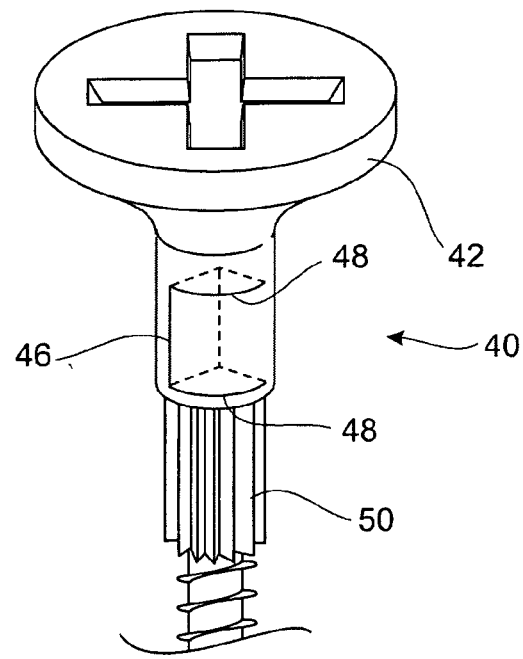
FIG. 11 shows a partial, perspective view of the finish screw fastener shown in FIGS. 9 and 10.

FIGS. 9, 10 and 11 illustrate a second, preferred embodiment 40 of the fastener.

The fastener 40 includes a full-size head 42 and a threaded shank 44 extending from the head. The fastener 40 includes a plurality of voids or scores. The fastener includes at least a first score 46 which is parallel to a center axis of the shank 44. The void or score extends radially from a periphery of the shank to a center axis. The voids or scores also include at least a second score or scores 48 which are perpendicular to the center axis. The second score passes through a portion of the diameter in a radial arc. As seen in FIG. 11, the second score extends through approximately 90° radially.

The second embodiment of the fastener 40 operates in the same manner as it permits rotational torque on the head in the clockwise direction significantly greater than rotational torque in the opposite, counter clockwise direction. Once the fastener has been rotated and screwed into the receiving material, rotational torque in the counter clockwise direction causes the head 42 to break off from the shank. To supplement the ability of the design to break off when driven in the counterclockwise direction, ratchet type features (e.g., one-way serrations) can be formed into the shank of the screw along one or all of the following locations:

1. the threads themselves
2. the root of the threads
3. the shank of the screw between the threads and the finish head
4. the base of the finish head
5. the outside of the finish head An example of number 3 is shown in FIGS. 9, 10 and 11 where serrated anti-reverse fins are induced into the shank between the threads and the finish head.

If the fastener is applied such that the underside of the head comes in contact the surface of the material, surface marring could occur. The finish head serrations are placed such that the head sinks below the surface before the underside of the larger head contacts the surface of the fastened material. However to provide added protection against marring, the lower edges of the full size head are beveled.

Whereas, the present invention has been described in relation to the drawings attached hereto, it should be understood that other and further modifications, apart from those shown or suggested herein, may be made within the spirit and scope of this invention.

What is claimed is:

1. A fastener comprising:
 a single piece device including a head portion with a lower end and
 a threaded shank portion having an upper end;
 saw tooth indentations located around the periphery of the fastener between the lower end of the head portion and the upper end of the shank portion with a plurality of teeth having a plurality of first edges parallel to a center axis of said shank and a plurality of second angled edges in angular relationship to said first edges in order to discourage rotation of said shank;
 wherein said angled edges are angled in the same direction as a thread pattern on said threaded shank; and
 wherein said head and said shank portions permit rotational torque in one direction significantly greater than rotational torque in an opposite direction, and wherein said saw tooth indentations are adapted to separate said head and said shank portions with the rotational torque in said opposite direction.

2. A fastener comprising:
 a single piece device including a head portion with a lower end and
 a threaded shank portion having an upper end;
 saw tooth indentations located around the periphery of the fastener between the lower end of the head portion and the upper end of the shank portion having a plurality of first edges parallel to a center axis of said shank and a plurality of second angled edges in angular relationship to said first edges wherein said second edges of said shank are at an approximately 45° angle to said first edges of said shank;
 wherein said angled edges are angled in the same direction as a thread pattern on said threaded shank; and
 wherein said head and said shank portions permit rotational torque in one direction significantly greater than rotational torque in an opposite direction and wherein said saw tooth indentations are adapted to separate said head and said shank portions with the rotational torque in said opposite direction.

* * * * *